(12) United States Patent
Jeong et al.

(10) Patent No.: US 12,176,929 B2
(45) Date of Patent: Dec. 24, 2024

(54) UNMANNED AERIAL VEHICLE LANDING SYSTEM

(71) Applicant: Argosdyne Co. Ltd., Gyeonggi-do (KR)

(72) Inventors: Seung Ho Jeong, Gyeonggi-do (KR); Seung Hyun Jung, Gyeonggi-do (KR)

(73) Assignee: ARGOSDYNE CO. LTD., Gyeonggi-Do (KR)

( * ) Notice: Subject to any disclaimer, the term of this patent is extended or adjusted under 35 U.S.C. 154(b) by 0 days.

(21) Appl. No.: 17/413,323

(22) PCT Filed: Jul. 18, 2019

(86) PCT No.: PCT/KR2019/008864
§ 371 (c)(1),
(2) Date: Jun. 11, 2021

(87) PCT Pub. No.: WO2020/171315
PCT Pub. Date: Aug. 27, 2020

(65) Prior Publication Data
US 2022/0009630 A1    Jan. 13, 2022

(30) Foreign Application Priority Data

Feb. 19, 2019    (KR) .......................... 10-2019-0018944

(51) Int. Cl.
*G05D 1/00*    (2024.01)
*G08G 5/00*    (2006.01)
(Continued)

(52) U.S. Cl.
CPC ........... *G05D 1/0016* (2013.01); *G05D 1/042* (2013.01); *G08G 5/0013* (2013.01);
(Continued)

(58) Field of Classification Search
CPC .... B64C 39/024; G05D 1/0016; G05D 1/042; G08G 5/0013; H04B 7/18506;
(Continued)

(56) References Cited

U.S. PATENT DOCUMENTS 9,817,396 B1 * 11/2017 Takayama ............ G08G 5/0013
11,074,447 B1 * 7/2021 Fox ....................... G08G 5/0013
(Continued)

OTHER PUBLICATIONS

Soo et al., Korean Patent Application Publication KR 10-2013-0120176 "translation" (Year: 2013).*

*Primary Examiner* — Hussein Elchanti
(74) *Attorney, Agent, or Firm* — Bridgeway IP Law Group, PLLC; Sang Ho Lee; Hyun Woo Shin

(57) ABSTRACT

An unmanned aerial vehicle landing system is disclosed. According to one aspect of the present invention, provided is an unmanned aerial vehicle landing system comprising: a step in which a server receives, from a wireless terminal, pixel coordinates of image data of an image sensor provided in an unmanned aerial vehicle; a coordinate transformation step in which the server transforms the pixel coordinates to absolute coordinates of the unmanned aerial vehicle on the basis of status information of the unmanned aerial vehicle; and a step in which the server transmits the absolute coordinates to the unmanned aerial vehicle. when receiving image data captured by an image sensor included in an unmanned aerial vehicle, displaying the image data on a display included in the user terminal, by a user terminal; transforming pixel coordinates into absolute coordinates of the unmanned aerial vehicle based on information on a state of the unmanned aerial vehicle, by the user terminal; and transmitting the absolute coordinates to the unmanned aerial vehicle, by the user terminal.

10 Claims, 12 Drawing Sheets

(51) Int. Cl.
*H04B 7/185* (2006.01)
*B64U 10/16* (2023.01)
*B64U 70/90* (2023.01)

(52) U.S. Cl.
CPC ......... *H04B 7/18506* (2013.01); *B64U 10/16* (2023.01); *B64U 70/90* (2023.01); *B64U 2201/20* (2023.01)

(58) Field of Classification Search
CPC .... B64U 10/13; B64U 2201/20; B64U 70/00; B64U 2101/30
See application file for complete search history.

(56) References Cited

U.S. PATENT DOCUMENTS

| | | | |
|---|---|---|---|
| 2010/0084513 A1* | 4/2010 | Gariepy | G05D 1/0094 244/190 |
| 2018/0275659 A1* | 9/2018 | Ono | B64U 20/87 |
| 2019/0003840 A1* | 1/2019 | Song | H04N 23/60 |
| 2019/0166765 A1* | 6/2019 | Maor | A01D 46/30 |
| 2019/0368133 A1* | 12/2019 | Joshi | E01B 35/06 |
| 2020/0402410 A1* | 12/2020 | Contreras | G05D 1/0094 |
| 2021/0012520 A1* | 1/2021 | Zhou | B64U 20/87 |
| 2021/0171193 A1* | 6/2021 | Men | G05D 1/0676 |
| 2021/0365725 A1* | 11/2021 | Ellison | G06T 3/4038 |
| 2021/0407126 A1* | 12/2021 | Grosgeorge | G06T 7/73 |

* cited by examiner

[FIG. 1]
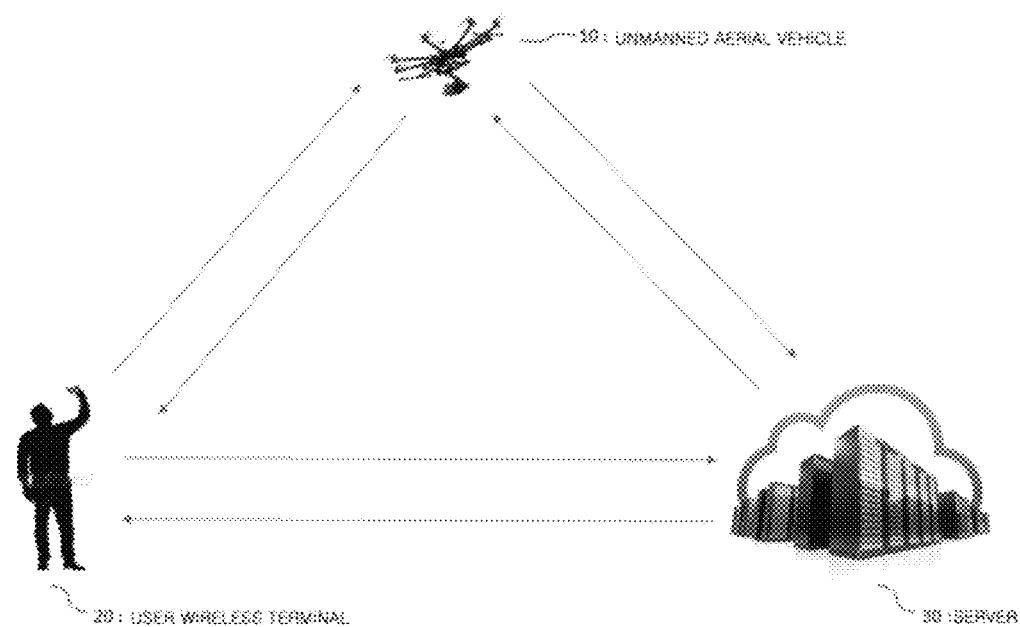

[FIG. 2]
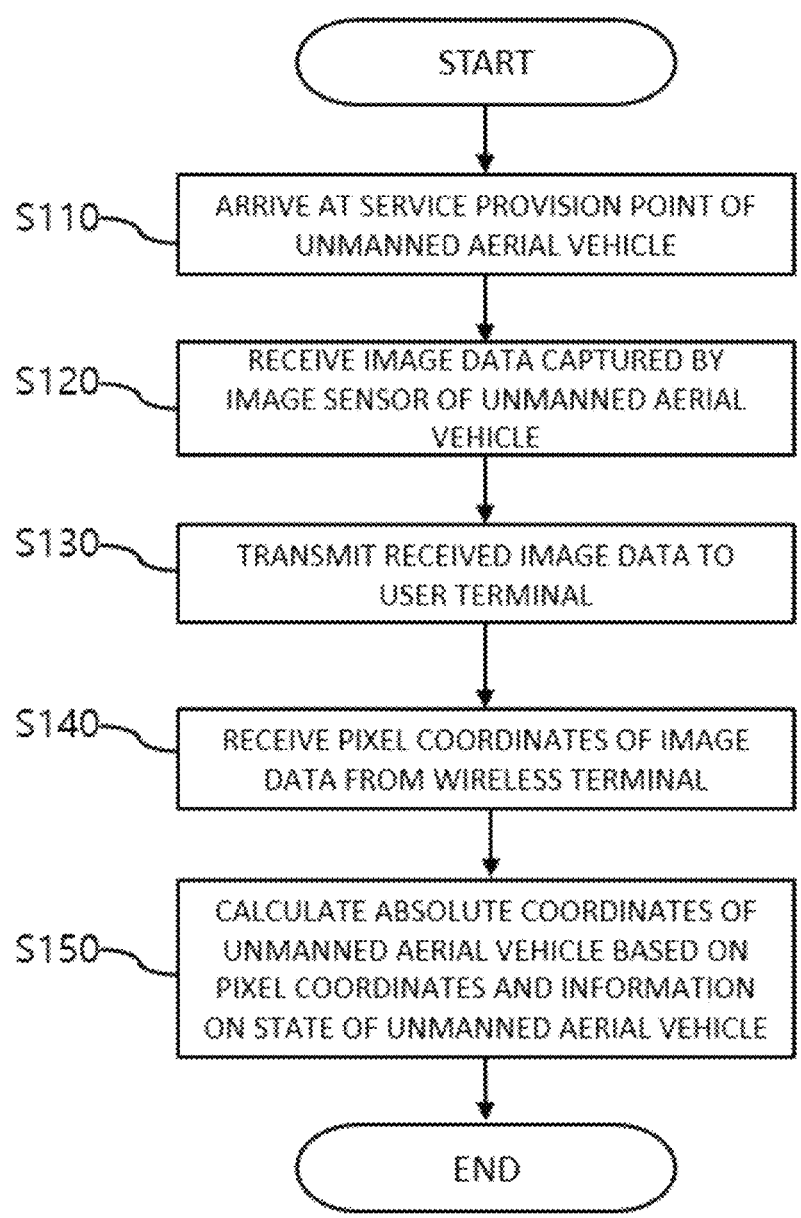

[FIG.3]
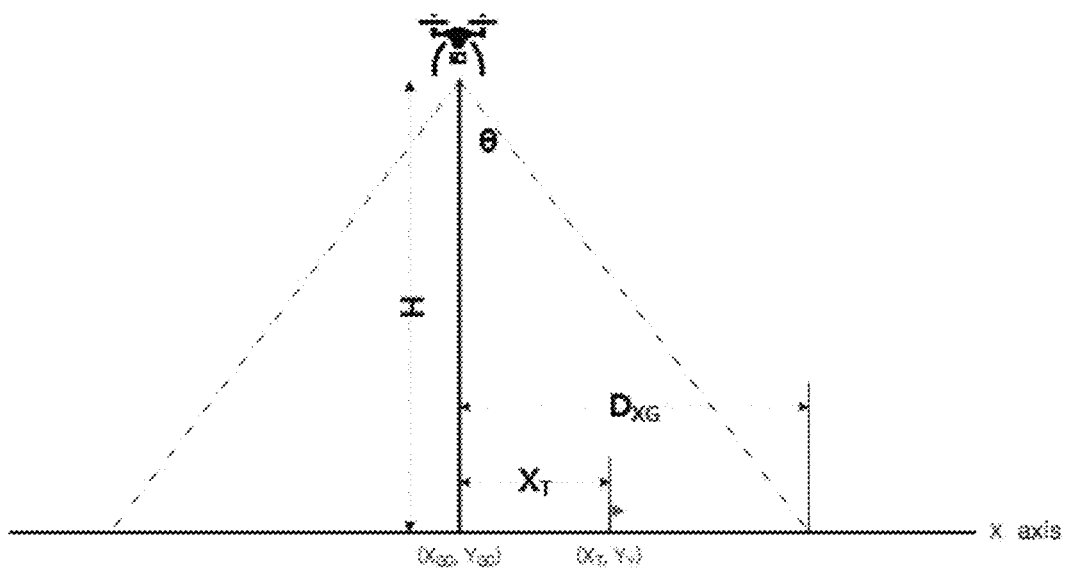

[FIG. 4]
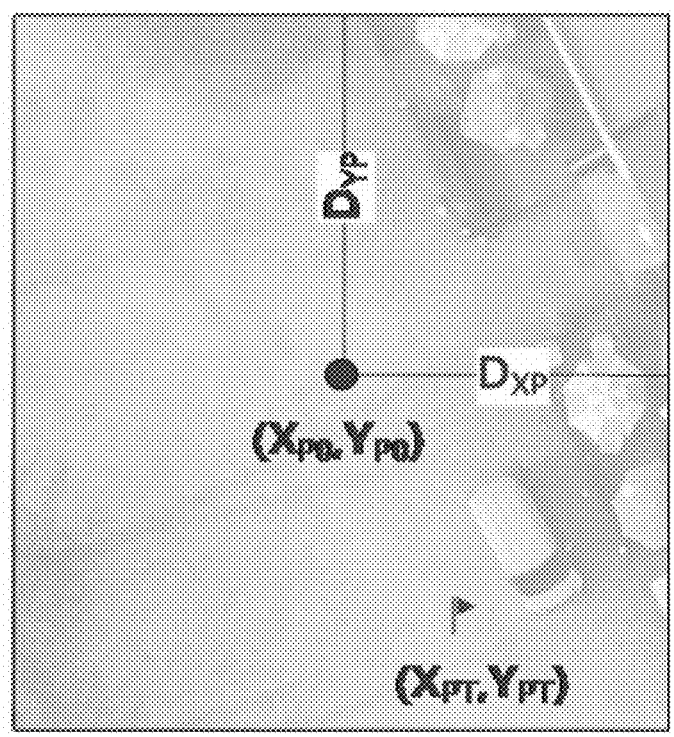

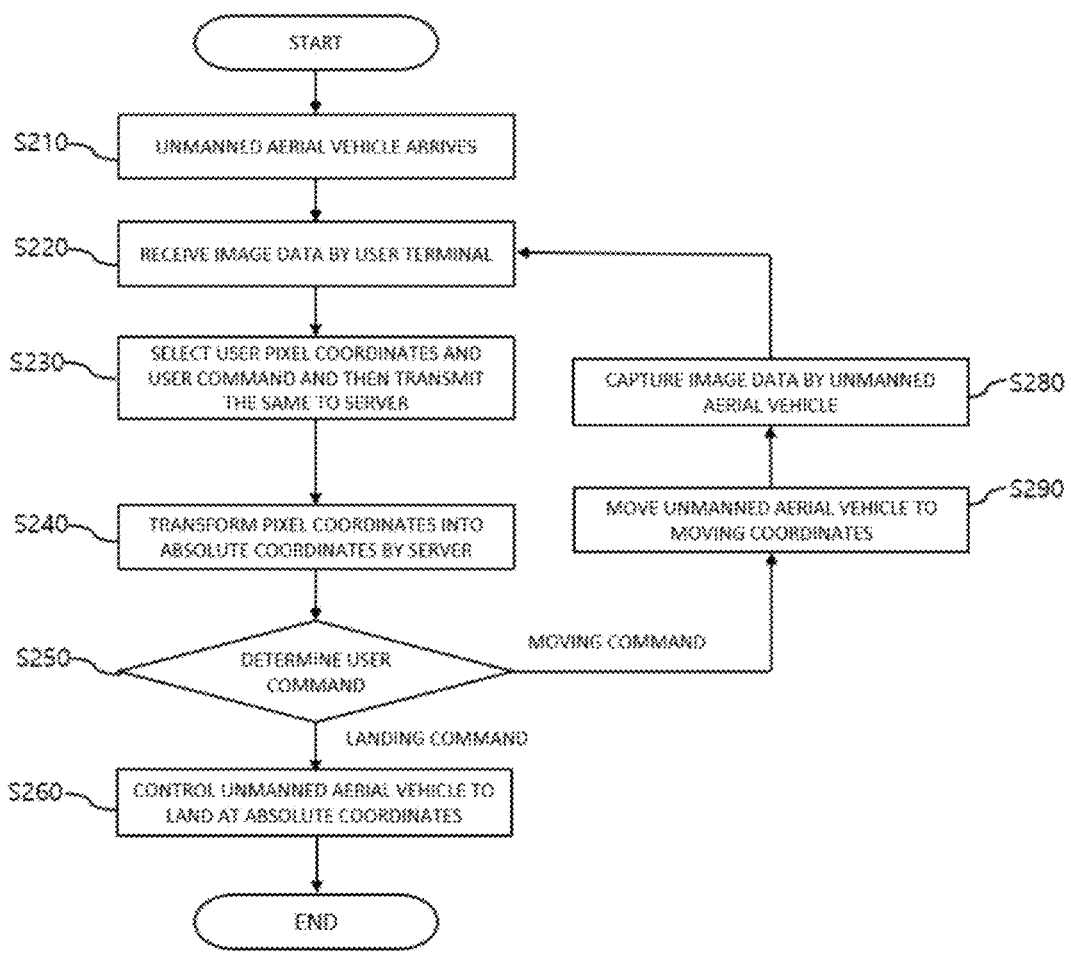
[FIG.5]

[FIG.6]
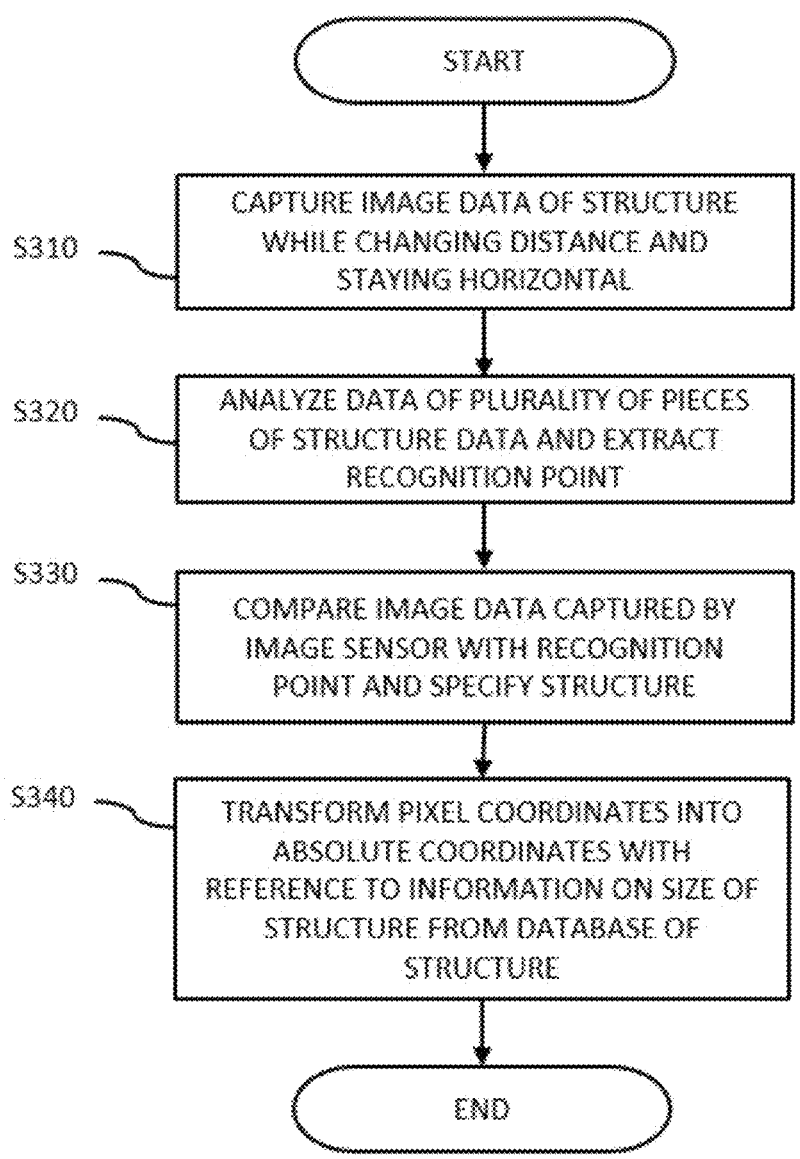

[FIG.7]
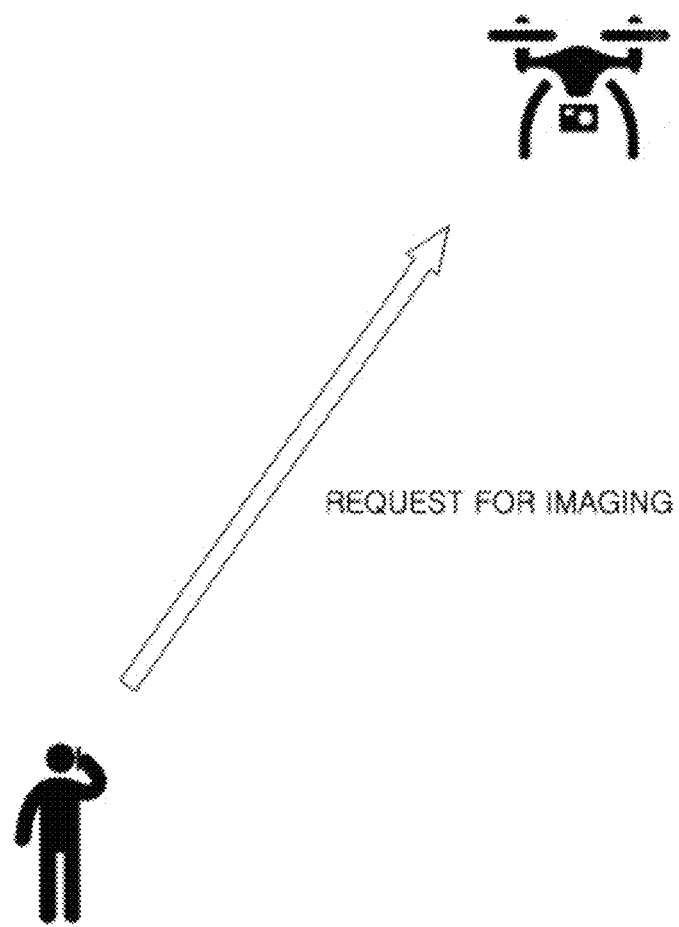

[FIG.8]
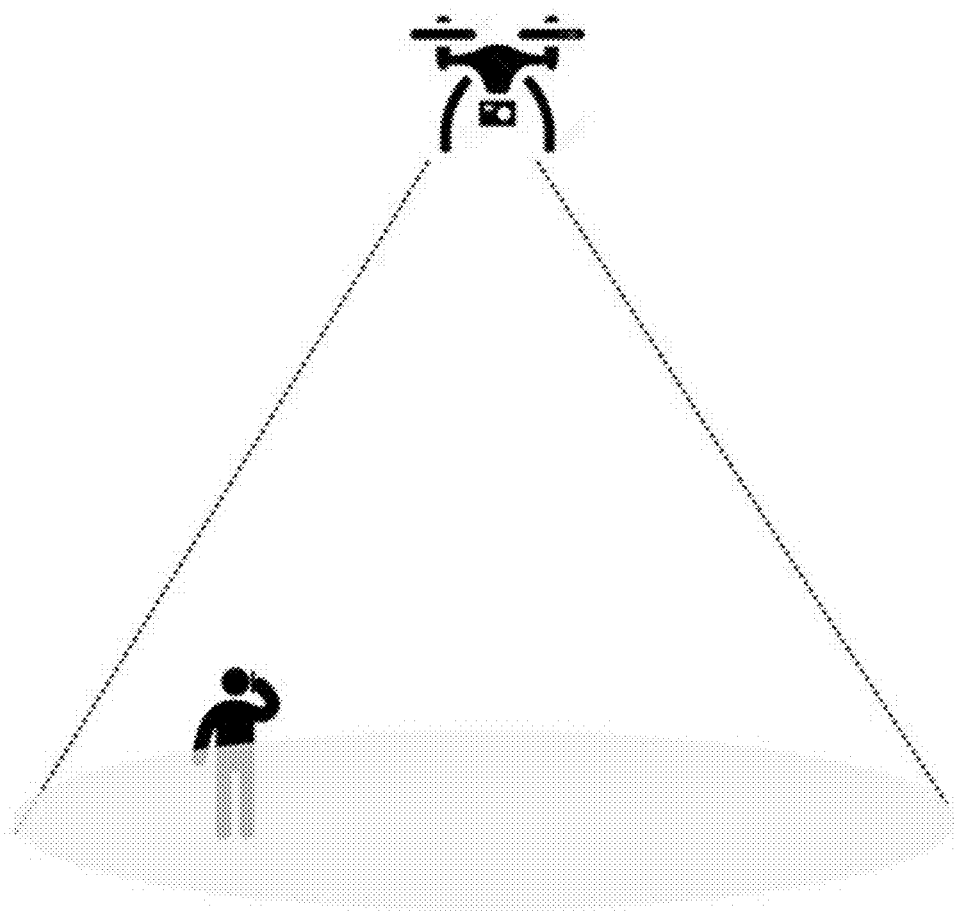

[FIG.9]
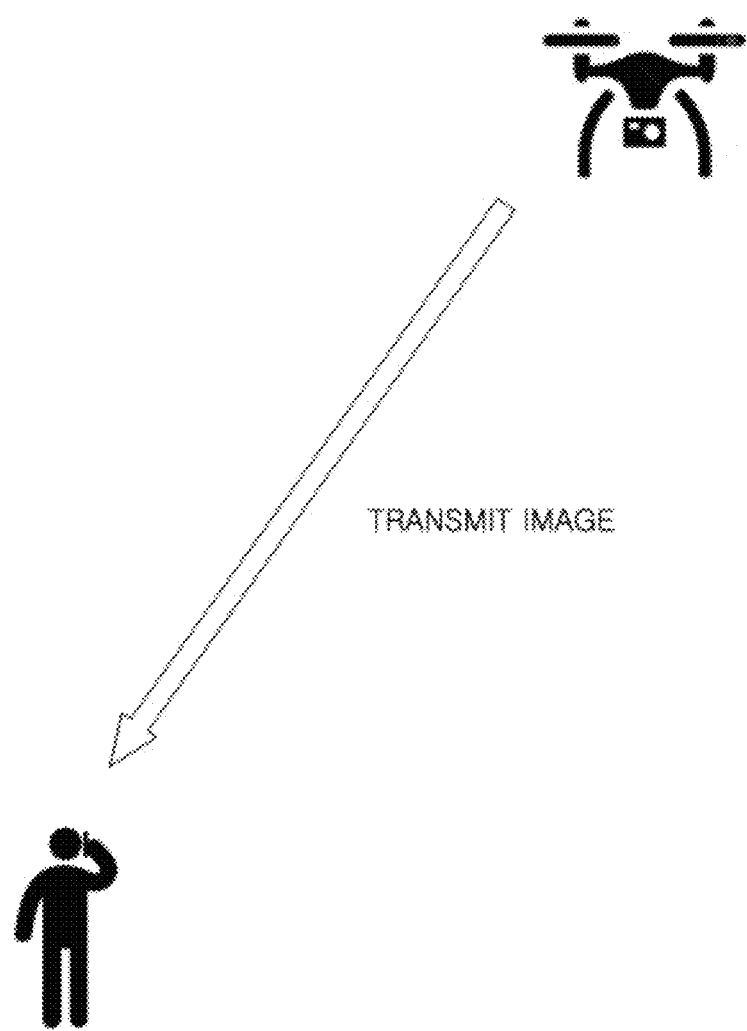

[FIG.10]

[FIG.11]

[FIG.12]
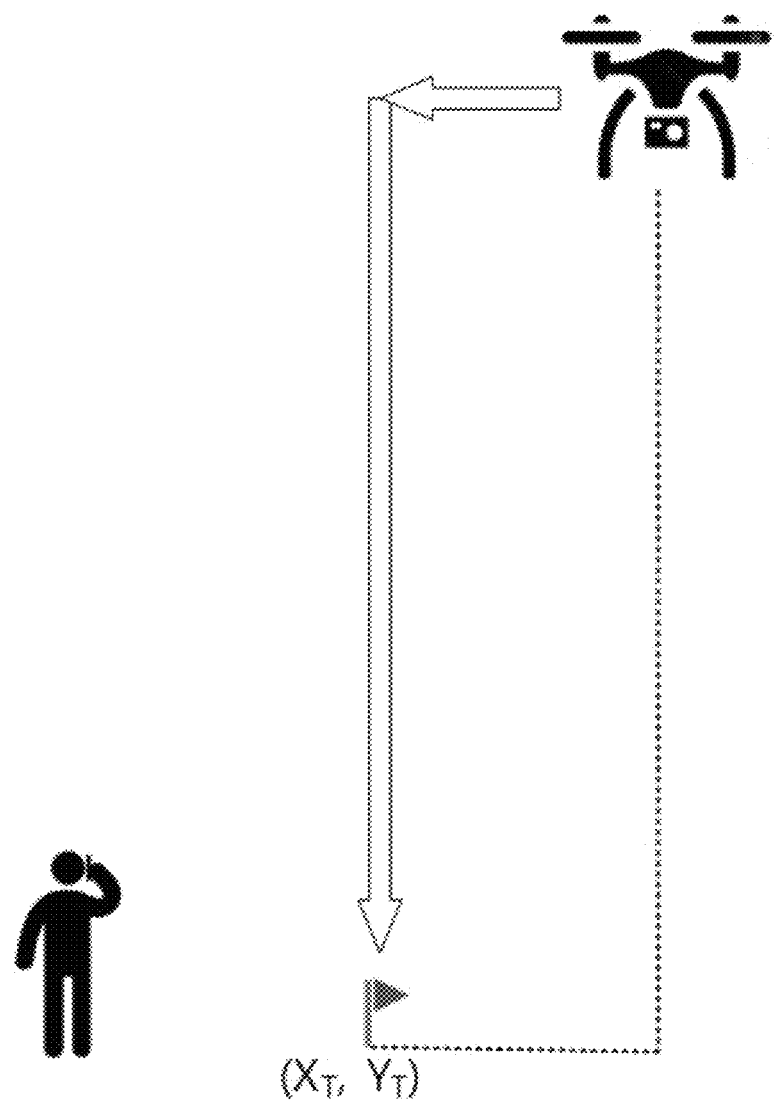

UNMANNED AERIAL VEHICLE LANDING SYSTEM

FIELD OF INVENTION

The present invention relates to an unmanned aerial vehicle, and more particularly to an unmanned aerial vehicle landing system.

BACKGROUND OF INVENTION

Currently, as the market for drones, which are unmanned aerial vehicles, is currently active, related industries such as delivery drones, pickup services, and provision of emergency supplies have expanded. Several related technologies are currently under development, but a technical problem arises in landing a drone at a service location due to a GPS position error or an obstacle such as a nearby structure.

In more detail, when location information of a recipient (user) is input, the drone flies toward the recipient through autonomous flight to the corresponding position as a destination. However, current GPS technology causes an error of 10 to 50 m, and especially, when there is an obstacle that obstructs a view of the drone (e.g., in a forest) or when unspecified people including the recipient is located at the destination (e.g., a park), there is a problem in that it is difficult to specify a landing point of the drone.

In addition, image processing and flight control technology have not been developed to the extent that a drone is capable of landing safely avoiding crowds including a user. As a cited reference related thereto, disclosed is "Human interaction with unmanned aerial vehicles" (U.S. Pat. No. 9,456,620, registered on Oct. 4, 2016). The cited reference discloses that a person guides an unmanned aerial vehicle through a gesture, etc. However, the gesture needs to be recognized through image processing or the like and it is impossible to inform a drone of an exact landing point through the gesture.

SUMMARY OF INVENTOIN

Technical Problem to be Solved

The present invention provides an unmanned aerial vehicle landing system. More particularly, the present invention provides a method of more safely landing an unmanned aerial vehicle by checking a landing point in the form of image data and selecting a landing place by a user.

Technical Solution

Therefore, the present invention provides an unmanned aerial vehicle landing system for performing a method including receiving pixel coordinates of image data of an image sensor included in an unmanned aerial vehicle from a wireless terminal, by a server, transforming the pixel coordinates into absolute coordinates of the unmanned aerial vehicle based on information on a state of the unmanned aerial vehicle, by the server, and transmitting the absolute coordinates to the unmanned aerial vehicle, by the server.

The method may further include, prior to the receiving the pixel coordinates, determining whether an imaging surface of the image data is kept horizontal to a ground based on at least one of azimuth information, acceleration information, or angular velocity information of the unmanned aerial vehicle, by the server, and transmitting a control command for staying the image surface of the image data horizontal, by the server.

The method may further include, upon receiving a request for imaging from the wireless terminal, transmitting a command for capturing the image data by the image sensor included in the unmanned aerial vehicle, by the server, and receiving the image data from the unmanned aerial vehicle and transmitting the image data to the wireless terminal, by the server.

The method may further include, upon receiving a user command from the wireless terminal, transmitting the user command to the unmanned aerial vehicle, by the server.

The method may further include, when the user command is a landing command, transmitting a command for controlling the unmanned aerial vehicle to land on the absolute coordinates to the unmanned aerial vehicle, by the server.

The method may further include, when the user command is a moving command, transmitting a command for controlling the unmanned aerial vehicle to move to moving coordinates to the unmanned aerial vehicle, by the server.

The server may transform the pixel coordinates into the absolute coordinates using the pixel coordinates, altitude information of the unmanned aerial vehicle, and a viewing angle of the image sensor as a parameter in the operation of transforming the pixel coordinates.

The server may correct the image data using a radial distortion constant, a tangential distortion constant, a focal distance, and lens-based image coordinates of a lens included in the image sensor.

The method may further include, receiving the information of the state of the unmanned aerial vehicle, including at least one of altitude information, location information, azimuth information, acceleration information, and angular velocity information of the unmanned aerial vehicle, or image data captured from the image sensor of the unmanned aerial vehicle, from the unmanned aerial vehicle, by the server.

The operation of transforming the pixel coordinates may include extracting recognition points from structure data that is captured a plurality of times for respective distances, by the server, matching the recognition points in the image data to specify a structure, by the server, and transforming the pixel coordinates into the absolute coordinates with reference to information on a size of the specified structure from a structure database, by the server.

The method may further include, upon receiving a request of imaging from the wireless terminal, requesting user authentication information to the wireless terminal, by the server, and upon receiving the user authentication information from the wireless terminal, determining whether the wireless terminal is appropriate based on the user authentication information, by the server.

The present invention provides an unmanned aerial vehicle landing system for performing a method including receiving pixel coordinates of image data of an image sensor included in an unmanned aerial vehicle from a wireless terminal, by the unmanned aerial vehicle, and transforming the pixel coordinates into absolute coordinates of the unmanned aerial vehicle based on information on a state of the unmanned aerial vehicle, by the unmanned aerial vehicle.

The method may further include determining whether an imaging surface of the image data is kept horizontal to a ground based on at least one of azimuth information, acceleration information, or angular velocity information of the unmanned aerial vehicle, by the unmanned aerial vehicle, and controlling a posture of the unmanned aerial vehicle to keep the unmanned aerial vehicle horizontal to an imaging surface of the image data.

The method may further include, prior to the receiving the pixel coordinates, upon receiving a request for imaging from the wireless terminal, capturing the image data through the image sensor included in the unmanned aerial vehicle, by the unmanned aerial vehicle, and transmitting the image data to the wireless terminal.

The present invention provides an unmanned aerial vehicle landing system for performing a method including, when receiving image data captured by an image sensor included in an unmanned aerial vehicle, displaying the image data on a display included in the user terminal, by a user terminal, transforming pixel coordinates into absolute coordinates of the unmanned aerial vehicle based on information on a state of the unmanned aerial vehicle, by the user terminal, and transmitting the absolute coordinates to the unmanned aerial vehicle, by the user terminal.

Effect of Invention

As described above, the present invention may provide an unmanned aerial vehicle landing system.

BRIEF DESCRIPTION OF DRAWINGS

FIG. 1 is a schematic diagram showing a communication connection relationship of an unmanned aerial vehicle 10, a user wireless terminal 20, and a server 30 according to the present invention.

FIG. 2 is a flowchart of a method according to the present invention from a server point of view.

FIG. 3 is a diagram showing a relationship between a selection point and the origin of absolute coordinates in an actual space of an unmanned aerial vehicle.

FIG. 4 is a diagram showing pixel coordinates and a selection point in image data.

FIG. 5 is a diagram showing a procedure of processing a user command according to an embodiment of the present invention.

FIG. 6 is a diagram showing a procedure of transforming pixel coordinates into absolute coordinates using an imaged structure according to an embodiment of the present invention.

FIG. 7 is a diagram showing an operation of requesting image data to an unmanned aerial vehicle by a user terminal according to an embodiment of the present invention.

FIG. 8 is a diagram showing an operation of photographing a landing point by an unmanned aerial vehicle according to an embodiment of the present invention.

FIG. 9 is a diagram showing a procedure of transmitting image data directly to a user terminal by an unmanned aerial vehicle according to an embodiment of the present invention.

FIG. 10 is a diagram showing an operation of selecting a moving command from a user terminal by a user according to an embodiment of the present invention.

FIG. 11 is a diagram showing an operation of selecting a landing command from a user terminal by a user according to an embodiment of the present invention.

FIG. 12 is a diagram showing an operation of landing an unmanned aerial vehicle on absolute coordinates according to an embodiment of the present invention.

BEST MODE

As the present invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention. In the description of the present invention, certain detailed explanations of related art are omitted when it is deemed that they may unnecessarily obscure the essence of the present invention.

Terms such as "first" and "second" are used herein merely to describe a variety of constituent elements and the constituent elements are not limited by the terms. The terms are used only for the purpose of distinguishing one constituent element from another constituent element.

The terms used in the present specification are used for explaining a specific exemplary embodiment, not limiting the present invention. Thus, singular expressions in the present specification encompass the plural expressions unless clearly specified otherwise in context. Also, terms such as "include" or "comprise" may be construed to denote a certain characteristic, number, step, operation, constituent element, or a combination thereof, but may not be construed to exclude the existence of or a possibility of addition of one or more other characteristics, numbers, steps, operations, constituent elements, or combinations thereof.

DESCRIPTION OF REFERENCE NUMERALS

10: unmanned aerial vehicle
20: user wireless terminal
30: server

MODE FOR INVENTION

Hereinafter, the present invention will be described in detail by explaining exemplary embodiments of the present invention with reference to the attached drawings. The same reference numerals in the drawings denote like elements, and a repeated explanation thereof will not be given.

Terms such as first, second, etc. used hereinafter are merely identification symbols for distinguishing the same or corresponding constituent elements, and the same or corresponding constituent elements are not limited by terms such as first and second.

In addition, the term "bond" does not mean only direct physical contact between components and may be used as a concept that encompasses the case in which the components are in contact with each other by interposing another component therebetween.

In addition, with respect to a computer program, the suffixes "module" and/or "unit" for components correspond to a part of a computer program for using a computer as a device of a specific function or for realizing the specific function in the computer. For example, the module A may be interpreted as a computer program for making the computer function as device A or a computer program for realizing the function A in the computer. As a method, the "operation" may be implemented and executed as a computer program in a computer.

The "module" and/or "unit" may constitute the "group".

An application refers to a set of a series of computer programs created to perform a specific task and is also referred to as an application program. A user may add related functions by installing the application according to an embodiment of the present invention in his or her electronic device.

The electronic device of the user in which the application is installed may include a CPU, RAM, ROM, or a storage device like a computer, a tablet computer, or a smartphone, may have an environment in which an entire system is controlled by a graphical operating system such as Windows, iOS, Android, or Linux, and particularly, may be specialized for a smartphone for sending and receiving phone calls and texts to registered contacts, capturing an image using a camera installed therein, and transmitting the captured image.

In addition, the flowchart in the drawings attached to the present specification is only for explaining the invention, and does not need to be a flowchart to be completely implemented without bugs on a computer.

The terminal mentioned in this specification is a general user terminal and may be a smartphone, a personal computer, a tablet computer, or the like.

FIG. 1 is a schematic diagram showing a communication connection relationship of an unmanned aerial vehicle 10, a user wireless terminal 20, and a server 30 according to the present invention.

Referring to FIG. 1, the unmanned aerial vehicle 10, the user wireless terminal 20, and the landing system may exchange data. In general, an unmanned aerial vehicle refers to an unmanned aerial vehicle that is not occupied by a person, but an effect of embodiments of the present invention may be applied to any flying vehicle that requires accurate recognition of the location of a user, and thus the unmanned aerial vehicle according to the present invention may collectively refer to moving devices that include a sensor, such as a photographing device (e.g., a camera), a geomagnetic sensor, a 3-axis acceleration sensor, or GPS (GNSS), installed therein and has information such as position coordinates and an azimuth angle.

A user according to the present invention may be any user who is serviced by an unmanned aerial vehicle, such as a recipient of goods delivered by an unmanned aerial vehicle, a pickup service user who requests an unmanned aerial vehicle service to deliver goods to another place, or a user who requests a drone on-demand videography service.

In general, a server may exchange data with an unmanned aerial vehicle and a user wireless terminal through wireless communication, but the present invention is not limited to wireless communication, and thus data may be exchanged through wired communication. In this specification, a description of technology of data exchange is omitted.

The server may receive information received from the unmanned aerial vehicle when the unmanned aerial vehicle approaches the server in order to provide a service using the unmanned aerial vehicle, such as goods delivery. Here, information received from the unmanned aerial vehicle may include flight-related information, status information, user information, location information, and the like of the unmanned aerial vehicle.

In more detail, the server may transmit information on the unmanned aerial vehicle, received from the unmanned aerial vehicle, to a user terminal. The server may continuously monitor a situation depending on whether the unmanned aerial vehicle is abnormal, recognition of a flight path, the state of a user, or the like and may calculate routing data of the unmanned aerial vehicle, required for landing and guidance, based on relative location information between the user and the unmanned aerial vehicle, altitude information, azimuth information, or the like when the unmanned aerial vehicle and the user are authenticated. The server may calculate the position of a landing point based on location information, azimuth information, and the like of the user when the unmanned aerial vehicle lands and may transmit the position of the landing point to the unmanned aerial vehicle.

The unmanned aerial vehicle may continuously transmit any state information and flight-related information of an aircraft, including a position, a speed, an azimuth, or a battery status to the server. The unmanned aerial vehicle may transmit the altitude, azimuth, and posture of the unmanned aerial vehicle, or the like at the time of arrival at coordinates of a recipient to the server.

According to an embodiment of the present invention, the server may receive information on the state of the unmanned aerial vehicle through an operation of receiving the information on the state of the unmanned aerial vehicle including at least one of altitude information, location information, azimuth information, acceleration information, and angular velocity information of the unmanned aerial vehicle, or image data captured by an image sensor of the unmanned aerial vehicle, from the unmanned aerial vehicle.

The user wireless terminal may transmit data and commands such as location, angle, azimuth, or altitude information of the wireless terminal. The user wireless terminal may display information and a situation of the unmanned aerial vehicle, which are transmitted from the server.

FIG. 2 is a flowchart of a method according to the present invention from a server point of view. Referring to FIG. 2, the method may include an operation in which an unmanned aerial vehicle arrives at a service provision point (S110), an operation of receiving image data captured by an image sensor of the unmanned aerial vehicle, by a server (S120), an operation of transmitting the received image data to a user terminal, by the server (S130), an operation of receiving pixel coordinates of the image data from the user wireless terminal, by the server (S140), and an operation of calculating absolute coordinates of the unmanned aerial vehicle based on the pixel coordinates and the information on the state of the unmanned aerial vehicle, by the server (S150).

According to an embodiment of the present invention, the unmanned aerial vehicle landing system may perform a method including an operation of receiving pixel coordinates of image data of an image sensor included in the unmanned aerial vehicle from a wireless terminal, by the server, a coordinate transformation operation of transforming the pixel coordinates into absolute coordinates of the unmanned aerial vehicle based on the information on the state of the unmanned aerial vehicle, by the server, and an operation of transmitting the absolute coordinates to the unmanned aerial vehicle, by the server.

In more detail, the unmanned aerial vehicle may move to a service provision point in order to provide a service. The server or the unmanned aerial vehicle may continuously monitor altitude information, location information, azimuth information, and posture information of the unmanned aerial vehicle from a sensor of the unmanned aerial vehicle. In addition, the server or the unmanned aerial vehicle may determine whether the unmanned aerial vehicle arrives at the service provision point based on the received location information.

FIG. 8 is a diagram showing an operation of photographing a landing point by an unmanned aerial vehicle according to an embodiment of the present invention. Referring to FIG. 8, the unmanned aerial vehicle including an image sensor may capture image data when the unmanned aerial vehicle hovers above the service provision point.

In more detail, when the unmanned aerial vehicle arrives at the service provision point in order to provide a service using the unmanned aerial vehicle to a recipient who has a wireless terminal, the server or the unmanned aerial vehicle may photograph a landing point using the image sensor included in the unmanned aerial vehicle. In this case, the image data may be captured while a lens of a photographing device is kept horizontal to a ground surface in the state in which the unmanned aerial vehicle hovers to maintain a constant altitude.

The image sensor may convert an optical image formed on a lens into an electrical signal and may include a charge coupled device (CCD), a metal oxide semi-conductor (MOS), and a complementary metal-oxide semiconductor (CMOS). However, the type of the image sensor may not be limited thereto. In addition, the image may be interpreted as a broad concept including not only a digital signal converted from an optical signal but also a result obtained by outputting the digital signal as light visualized through a display device.

Imaging or capturing image data may refer to a series of procedures of converting an optical signal into image data using the image sensor. In more detail, the image data may mean still image data and may refer to data stored by digitizing an image, which is imaged through the image sensor, in units of pixels. The image data may be stored compressed, decompressed, or in vector format and may be expressed as a quadratic matrix including only a planar position of a pixel or a cubic matrix including color information. In addition, the image data may be stored in the form of ani, bmp, cal, fax, gif, hdp, img, jpe, jpec, jpg, mac, pbm, pcd, pct, pcx, pgm, png, ppm, psd, ras, tga, tif, tiff, or wmf, which are image file formats.

According to an embodiment of the present invention, the server may control the unmanned aerial vehicle to keep the image horizontal based on at least one of azimuth information, acceleration information, or angular velocity information of the unmanned aerial vehicle through an operation of determining whether an imaging surface of the image data is kept horizontal, and an operation of transmitting a control command to the unmanned aerial vehicle by the server in order to keep the image surface of the image data horizontal.

The unmanned aerial vehicle may directly control a posture thereof based on at least one of azimuth information, acceleration information, or angular velocity information of the unmanned aerial vehicle through the operation of determining whether the imagiwhile stayingng surface of the image data is kept horizontal to the ground, and an operation of controlling the unmanned aerial vehicle to keep the unmanned aerial vehicle horizontal to the imaging surface of the image data.

The unmanned aerial vehicle may include a sensor such as a magnetometer, a 3-axis accelerometer, or a 3-axis gyroscope in order to control the posture of the unmanned aerial vehicle. The server or the unmanned aerial vehicle may calculate the posture (Roll and Pitch) of the unmanned aerial vehicle based on the acceleration measured by the accelerometer and the angular velocity measured by the gyroscope.

The imaging surface may refer to the area of a film or a device that receives light from a light collector of a camera, such as a CCD or CMOS sensor of a digital camera and may mean a part of the image sensor, on which an image of a substrate is formed. When the imaging surface of the image data is horizontal to the ground surface, this may mean that a distance between a lens and an imaged part of the ground is not changed even if an image of image data is horizontal to the ground surface and any point of the image data is symmetrically moved up, down, left, and right. In a general photographing device, the imaging surface of the image sensor is horizontal to the lens, and thus keeping the lens horizontal to the ground and keeping the imaging surface horizontal to the ground may have the same meaning. In this case, the ground may refer to an imaginary plane formed when the ground surface is assumed to be a plane.

The server or the unmanned aerial vehicle may determine whether image data is captured in the state in which the lens of the image sensor is kept horizontal to a landing point using posture information and image data of the unmanned aerial vehicle. The server or the unmanned aerial vehicle may be controlled to capture image data while staying horizontal. By staying the lens of the image sensor horizontal to the landing point, the captured image data may be captured horizontally to the ground surface, and thus a calculation procedure of transforming pixel coordinates of the image data into absolute coordinates may be simplified.

FIG. 7 is a diagram showing an operation of requesting image data to an unmanned aerial vehicle by a user terminal according to an embodiment of the present invention. According to an embodiment of the present invention, a user wireless terminal may request the server or the unmanned aerial vehicle to capture image data. In detail, when the unmanned aerial vehicle arrives at a service provision point, the user wireless terminal may be informed of arrival thereof in the form of a message. A user may request imaging of image data of the landing point of the unmanned aerial vehicle through a combination of operations such as clicking or dragging on the user terminal.

FIG. 9 is a diagram showing a procedure of transmitting image data directly to a user terminal by an unmanned aerial vehicle according to an embodiment of the present invention.

The request for imaging may be transmitted to the unmanned aerial vehicle directly from the user wireless terminal or transmitted to the unmanned aerial vehicle through the server, and the unmanned aerial vehicle may capture image data through a series of procedures of capturing image data. The captured image data may be transmitted to the user wireless terminal directly from the unmanned aerial vehicle or may be transmitted to the user wireless terminal through the server.

When the user wireless terminal transmits directly to the unmanned aerial vehicle or the server receives the request of imaging from the user wireless terminal, the user may request image data to the unmanned aerial vehicle through an operation of sending a command to cause the image sensor included in the unmanned aerial vehicle to capture the image data, and an operation of receiving the image data from the unmanned aerial vehicle and transmitting the image data to the wireless terminal by the server.

In this case, before receiving the request for imaging of the wireless terminal, a user authentication procedure may be performed. For example, the authentication procedure may include an operation of requesting user authentication information to the wireless terminal when the server receives the request for imaging from the wireless terminal, and an operation of determining whether the wireless terminal is appropriate based on the user authentication information when the server receives the user authentication information from the wireless terminal. In this case, communication between the wireless terminal, the server, and the unmanned aerial vehicle may be encrypted and performed, thereby improving security of communication.

The captured image data may be transmitted to the user terminal through the server. The transmitted image data may be registered and may be displayed on a display included in the user terminal. The image data displayed on the display may be configured to allow the user to select an arbitrary point, and simultaneously, may include a specific point for allowing the user to select a command to be issued by the user through an operation such as clicking.

In this case, a selection point may refer to a specific point on an actual ground surface corresponding to the point selected by the user in the image data captured when the lens of the image sensor is horizontal to the ground surface. In this case, coordinates of the selection point based on the origin on the ground surface perpendicular to the unmanned aerial vehicle in space may be referred to as absolute coordinates.

In more detail, for example, when the user terminal displays the image data of the landing point on the display and the user touches and selects an arbitrary point of the image data, the wireless terminal may refer to the pixel coordinate value of the corresponding selection point. The wireless terminal may query a user command through various methods (e.g., a text or a voice message) before and after the user selects an arbitrary point.

The user may select a desired user command through manipulation such as clicking, and the pixel coordinates of the selected user command and the selection point may be transmitted directly to the unmanned aerial vehicle or transmitted to the unmanned aerial vehicle through the server. The user command may be a command that is transmitted from the user terminal and is transmitted directly to the unmanned aerial vehicle or is transmitted to the unmanned aerial vehicle through the server to control an operation such as movement or landing of the unmanned aerial vehicle. The user command and the movement of the unmanned aerial vehicle based thereon will be described below in detail with reference to FIG. 5.

In this case, in the coordinate transformation operation, the server may transform the pixel coordinates into the absolute coordinates using the pixel coordinates, altitude information of the unmanned aerial vehicle, and a viewing angle of the image sensor as a parameter.

FIG. 4 is a diagram showing pixel coordinates and a selection point in image data.

Referring to FIG. 4, the pixel coordinates may refer to coordinates of an image displayed on the display in units of pixels, which are basic elements of rasterized image data. In addition, when the center of an image is the origin, a coordinate system may have a rightward direction as an x-axis increasing direction and an upward direction as a y-axis increasing direction. In this case, referring to FIG. 3, the origin of the pixel coordinates may be represented by $(X_{GO}, Y_{GO})$, pixel coordinates of the selection point of the user in image data may be represented by $(X_{PI}, Y_{PI})$, a distance to an end point of an image based on an X coordinate line may be represented by $D_{XP}$, and a distance to an end point of the image based on a Y coordinate line may be represented by $D_{YP}$.

FIG. 3 is a diagram showing a relationship between a selection point and the origin of absolute coordinates in actual space of an unmanned aerial vehicle.

Referring to FIG. 3, the absolute coordinates may be two-dimensional ground coordinates based on the actual position of the unmanned aerial vehicle as the origin. An absolute coordinate system may have a substantial distance as a basic unit (e.g., m, inch, or ft). In addition, when a line is drawn perpendicularly to the ground from the center point of a camera lens of a photographing device, a point that meets the ground may be the origin, a rightward direction in the image data may be an X-axis increasing direction, and an upward direction may be a Y-axis increasing direction. The origin of the two-dimensional ground coordinate system using the position of a drone as the origin may be represented by $(X_{GO}, Y_{GO})$, a viewing angle of the camera lens may be represented by θ, the maximum distance on the X axis, with which it is possible to capture an image using a camera lens, may be represented by $D_{XG}$, and the altitude of the drone may be represented by H.

[86] Image data may be captured in the state in which the lens is kept horizontal to the ground surface, and pixel coordinates may be transformed into absolute coordinates using a viewing angle of the lens and the altitude of the unmanned aerial vehicle as a parameter. A detailed transformation formula between the pixel coordinates and the absolute coordinates is as follows.

$$X_T = \frac{H\tan(\theta)}{D_{XP}} X_{PT}$$

($X_T$: absolute coordinates, $X_{PT}$: pixel coordinates, H: altitude of unmanned aerial vehicle, θ: viewing angle of photographing device, and $D_{XP}$: distance to end point of image on x axis from origin on image (in units of pixels))

When image data is captured in the state in which the lens is kept horizontal to the ground surface, there are several proportional relationships between pixel coordinates and absolute coordinates. First, a predetermined ratio between a length on the ground surface and the number of pixels in the image data may be maintained. The viewing angle may be a unique value depending on the type of a lens and may refer to an angle between the center of the lens and the range within which it is possible to capture an image. The maximum region in which the lens is capable of capturing an image through an image sensor may be calculated using the viewing angle. The maximum region in which the lens is capable of capturing an image may be calculated as an actual length using a tangent value of the altitude and the viewing angle. In this case, a predetermined ratio between both ends in the image data and the maximum region in which the lens is capable of capturing an image may be maintained, and a procedure of transforming a pixel coordinate value into absolute coordinates using a proportional relationship of each length may be summarized by the above equation. Accordingly, the absolute coordinates of the unmanned aerial vehicle may be calculated using the altitude, the viewing angle, and the pixel coordinates of the unmanned aerial vehicle as a parameter. In this case, a calculation procedure may be performed by any device of the unmanned aerial vehicle, the server, and the wireless terminal.

According to an embodiment of the present invention, the altitude may be measured by sensors, such as an acceleration sensor, an altimeter, or an odometer, included in the unmanned aerial vehicle or a combination thereof.

In general, the altitude of the unmanned aerial vehicle may be measured by the acceleration sensor. However, data measured by the acceleration sensor may be acquired by integrating acceleration to calculate altitude, and it is difficult to accurately measure surface altitude due to accumulated integral errors.

An odometer for measuring the distance between the unmanned aerial vehicle and the ground using ultrasonic, laser or LiDAR based-sensors may be used. In addition, a satellite altimeter for calculating the length of a GPS satellite signal and representing an altitude value may be used.

More accurate altitude values may be calculated by combining measured values from a plurality of sensors. For example, the altitude of the unmanned aerial vehicle may be more accurately measured by combining altitude data measured by the acceleration sensor, the odometer, the altimeter, and the image sensor using an extended Kalman filter.

According to an embodiment of the present invention, a procedure of transforming pixel coordinates into absolute coordinates may be performed by analyzing information on various structures included in the image data. In more detail, the procedure may include an operation of extracting recognition points from structure data that is captured a plurality of times for respective distances by a server, an operation of matching the recognition points in the image data to specify a structure by the server, and an operation of calculating altitude information with reference to information on the size of the specified structure in a database of the structure by the server.

FIG. 6 is a diagram showing a procedure of transforming pixel coordinates into absolute coordinates using an imaged structure according to an embodiment of the present invention.

With reference to FIG. 6, the procedure of transforming pixel coordinates into absolute coordinates using the structure may include an operation of imaging a structure database while changing a distance and staying horizontal (S310), an operation of extracting a recognition point by analyzing a plurality of pieces of structure data (S320), an operation of comparing image data captured by the image sensor with the recognition point to specify a structure (S330), and an operation of transforming pixel coordinates into absolute coordinates with reference to information on the size of the structure from the structure database (S340).

In more detail, structure data may be stored in the structure database included in the server or the unmanned aerial vehicle. The structure database may be a database for storing entire information on the structure of each structure and the information on the structure may include information on the material characteristics, geometry, size, length, and image data of the structure.

The structure data may correspond to an image captured by photographing the structure while a distance is changed in the state in which the lens is kept horizontal to the ground surface, and the server may extract the recognition point based on the structure data. In this case, the recognition point may refer to a characteristics part for recognizing the specific structure when the specific structure is compared with another structure. Each recognition point may be determined through an algorithm for extracting the recognition point.

For example, a SIFT algorithm, a SURF algorithm, or the like may be used as the algorithm for extracting the recognition point. The SIFT algorithm and the SURF algorithm may include an operation of searching for the recognition point and an operation of comparing and matching the recognition points. In this case, the recognition point may be a point, the size and direction of which are not expected to be changed, and may use a Gaussian filter and difference of Gaussian (DoG). However, a method of extracting the recognition point is not limited by the described algorithm.

The server may search for the recognition point to recognize the structure by combining the structure data and may refer to the information on the size of the structure from the structure database. In this case, a ratio between a pixel number and an actual size may be calculated using information on the size of the referenced structure and the number of pixels of the recognized structure, and pixel coordinates may be transformed into absolute coordinates using the calculated ratio.

In this case, the structure data may also be captured while staying horizontal like the image data, and thus even if the structure data is captured while a distance is changed, a predetermined ratio between recognition points may be maintained. Accordingly, pixel distances between the recognition points may be compared, and an actual distance between the recognition points may be calculated with reference to the geometry and the information on the size of the structure, stored in the structure database. The pixel coordinates may be transformed into the absolute coordinates using a ratio between the actual distance and the pixel distance of the recognition points.

A passenger car shown in the image data of FIG. 10 will be exemplified, and in this case, information on the size and a geometric shape of the vehicle shown in the image data may be pre-stored in the structure database. The structure database may store the structure data in the form of an image that is captured while staying horizontal and changing the altitude of the corresponding passenger car. A plurality of pieces of structure data may each be analyzed using an algorithm for extracting the recognition point, and a recognition point for recognizing the passenger car may be selected. The selected recognition point and an actual distance between the recognition points may also be stored in the structure database.

The server may compare and analyze the image data received from the unmanned aerial vehicle with the recognition point stored in the structure database and may determine whether a specific passenger car is contained in the image data. Pixel coordinates may be transformed into absolute coordinates using a ratio between a pixel distance and an actual distance, information on the size of the structure, and a geometric shape, which are stored in the structure database, as a parameter.

The procedure of transforming the pixel coordinates into the absolute coordinates using the structure may be performed by the wireless terminal or the unmanned aerial vehicle itself as well as through the server.

In this case, an error may occur due to distortion of the lens when the pixel coordinates are transformed into the absolute coordinates using the image data. Distortion of the lens may include radial distortion due to a refractive index of a convex lens and tangential distortion that occurs because a camera lens and an image sensor are not horizontal to each other or the lens itself is not centered during a procedure of manufacturing an imaging device.

When there is no distortion in a lens system, one point on a three-dimensional space may be projected to one point on a normalized image plane to have linearity through pinhole projection. However, distortion may occur due to the nonlinearity of the lens system, and image data may be corrected by applying a distortion model of the lens system and an internal parameter of an imaging device.

The distortion model of the lens system is as follows.

$$\begin{bmatrix} x_{n_d} \\ y_{n_d} \end{bmatrix} = (1 + k_1 r_u^2 + k_2 r_u^4 + k_3 r_u^6) \begin{bmatrix} x_{n_a} \\ y_{n_a} \end{bmatrix} + \begin{bmatrix} 2p_1 x_{n_a} y_{n_a} + p_2(r_u^2 + 2x_{n_a}^2) \\ p_1(r_u^2 + 2y_{n_a}^2) + 2p_2 x_{n_a} y_{n_a} \end{bmatrix}$$

($k_1$, $k_2$, $k_3$: radial distortion constant, $p_1$, $p_2$: tangential distortion constant, ($x_{n_d}$, $y_{n_d}$): normalized coordinates to which distortion of the lens system is applied, ($x_{n_a}$, $y_{n_a}$): distortion due to the nonlinearity of the lens system, and $r_u$: distance to the center when there is no distortion)

Distortion of the image data may be corrected using a radial distortion constant, a tangential distortion constant, a focal distance, and lens-based image coordinates of the lens included in the image sensor as a parameter based on the distortion model of the lens system. Distortion of the image data may be corrected irrespective of a device such as a server, a user terminal, or an unmanned aerial vehicle.

FIG. 5 is a diagram showing a procedure of processing a user command according to an embodiment of the present invention.

Referring to FIG. 5, the unmanned aerial vehicle landing system may perform a method including an operation in which an unmanned aerial vehicle arrives (S210), an operation in which a user terminal receives image data (S220), an operation in which a user selects pixel coordinates and a user command and transmits the pixel coordinates and the user command to a server through the user terminal (S230), an operation of transforming pixel coordinates into absolute coordinates by the server (S240), an operation of determining the user command by the server (S250), an operation of controlling the unmanned aerial vehicle to land on absolute coordinates when the user command is a landing command (S260), an operation of moving the unmanned aerial vehicle to moving coordinates when the user command is a moving command (S290), and an operation of capturing image data by the unmanned aerial vehicle (S280).

Upon receiving the user command from the wireless terminal, the server may transmit a command of the wireless terminal to the server through the operation of transmitting the user command to the unmanned aerial vehicle by the user. In this case, when the user command is the landing command, the server may transmit a command for controlling the unmanned aerial vehicle to land on the absolute coordinates to the unmanned aerial vehicle, and when the user command is the moving command, the server may transmit a command for controlling the unmanned aerial vehicle to move to the moving coordinates to the unmanned aerial vehicle.

The server may receive information on the unmanned aerial vehicle from the unmanned aerial vehicle. When the unmanned aerial vehicle arrives at a service provision point, the user terminal may be notified of arrival of the unmanned aerial vehicle using various methods (e.g., a message or voice notification). In this case, the user may select the user command by manipulating the user terminal.

Here, the user command may refer to a series of commands for directly manipulating the unmanned aerial vehicle by the user terminal or manipulating the unmanned aerial vehicle through the server by the user terminal. According to the present invention, the user command may refer to a moving command or a landing command.

Upon receiving notification of arrival from the unmanned aerial vehicle, the user terminal may display a button or the like for selecting the user command through manipulation such as clicking or dragging by the user.

FIG. 10 is a diagram showing an operation of selecting a moving command from a user terminal by a user according to an embodiment of the present invention.

FIG. 11 is a diagram showing an operation of selecting a landing command from a user terminal by a user according to an embodiment of the present invention.

In this case, the unmanned aerial vehicle may transmit image data captured by an image sensor of the unmanned aerial vehicle together with notification of arrival. Referring to FIGS. 10 and 11, when there is a desired landing point in the image data displayed on the display of the wireless terminal as shown in FIG. 11, a landing command may be issued to land on a corresponding point. However, as shown in FIG. 10, when the user determines that there is no appropriate landing point, the landing point may be searched for through movement to another point in the image data.

According to manipulation of the user, the user command and the selection point may be specified. The selection point selected by the user and the user command may be transmitted directly to the server or the unmanned aerial vehicle or may be transmitted to the unmanned aerial vehicle through the server.

When the user selects the landing command through the user terminal, the server may receive the landing command and the pixel coordinates. The absolute coordinates of the selection point may be calculated through the aforementioned procedure of transforming coordinates. In this case, the landing command may be a command for landing the unmanned aerial vehicle on the selection point on the ground surface, selected through the procedure of transforming coordinates.

FIG. 12 is a diagram showing an operation of landing an unmanned aerial vehicle on absolute coordinates according to an embodiment of the present invention.

Referring to FIG. 12, the unmanned aerial vehicle may move to moving coordinates while maintaining the same altitude during a procedure of landing on the selection point on the ground surface and may then be controlled to land by adjusting a throttle to decrease altitude. In this case, the moving coordinates may refer to spatial coordinates of a point that meets a perpendicular of the selection point at the same altitude as the unmanned aerial vehicle based on absolute coordinates using the ground surface as the origin.

The user may select the moving command. When the moving command is selected, the server may transmit a command for moving the unmanned aerial vehicle to the moving coordinates to the unmanned aerial vehicle. Upon receiving the moving command, the unmanned aerial vehicle may move the moving point at a predetermined altitude. After moving to the moving point, the unmanned aerial vehicle may notify the wireless terminal of completion of movement.

When there is the moving command for the unmanned aerial vehicle, the server may control the unmanned aerial vehicle to move to the moving point perpendicular to the selection point while maintaining the altitude. The unmanned aerial vehicle may completely move to the moving point, and the image data may be captured using the image sensor while being kept horizontal.

The captured image data may be transmitted to the user wireless terminal through the server, the user may specify the selection point through manipulation, and a point on which an aerial vehicle is supposed to land may be selected by repeatedly performing a series of user command selection procedures of selecting the moving command or the landing command of the aerial vehicle.

In this case, the landing command, the moving command, and the image data may be transmitted directly to the user terminal or the unmanned aerial vehicle without going through the server, and the procedure of transforming pixel coordinates of image data into absolute coordinates of the unmanned aerial vehicle may be performed by any one of three devices of the server, the unmanned aerial vehicle, and the wireless terminal.

According to an embodiment of the present invention, upon receiving image data captured by an image sensor included in the unmanned aerial vehicle, the user terminal may process data through an operation of displaying the image data on a display included in the user terminal, a coordinate transformation operation of transforming the pixel coordinates into absolute coordinates of the unmanned aerial vehicle based on information on the state of the information on the state of the unmanned aerial vehicle by the user terminal, and an operation of transmitting the absolute coordinates to the unmanned aerial vehicle by the user terminal.

The aforementioned method and processing, for example, commands for execution by a processor, a controller, or other processing devices, may be encoded, or may also be stored in machine-readable or computer-readable media, such as a compact disc read-only memory (CDROM), a magnetic disc, an optical disc, a flash memory, a random access memory (RAM), a read-only memory (ROM), an erasable programmable read-only memory (EPROM), or other machine-readable media.

Such a medium may be implemented as any device that contains, stores, communicates, propagates, or moves executable commands to be used by a command executable system, apparatus, or device or to be used in connection therewith. Alternatively or additionally, the medium may be implemented in analog or digital logic using hardware such as one or more integrated circuits, or one or more processor-executable commands, in software of available functions in an application programming interface (API), a dynamic link library (DLL), or a memory defined or shared as local or remote process call, or in a combination of hardware and software.

According to other embodiments, the method may be represented as a signal or a radio-signal medium. For example, commands for implementing logic of an arbitrary predetermined program may be configured in the form of electrical, magnetic, optical, electromagnetic, infrared, or other types of signals. The aforementioned system may receive these signals at a communication interface such as a fiber optic interface, an antenna, or other analog or digital signal interfaces, may restore commands from the signal, may store the commands in a machine-readable memory, and/or may execute the commands using a processor.

In addition, the present invention may be implemented in hardware or software. The present invention may also be implemented as computer-readable code on a computer-readable recording medium. The computer-readable recording medium may include all types of recording devices that store data read by a computer system. Examples of computer-readable recording media may include ROM, RAM, CD-ROM, magnetic tapes, floppy disks, optical data storage devices, etc. and may also be implemented in the form of carrier waves (for example, transmission through the Internet). In addition, the computer-readable recording medium may be distributed over a computer system connected through a network and computer-readable codes may be stored and executed in a distributed manner. In addition, functional programs, codes, and code segments for implementing the present invention may be easily inferred by programmers in the art to which the present invention pertains.

Embodiments of the present invention may include a carrier wave having electronically readable control signals, which is operated by a programmable computer system in which one of the methods described herein is executed. Embodiments of the present invention may be implemented as a computer program compiled from program code, and the program code may be operated to execute one of methods used when the computer program is driven on a computer. The program code may be stored on, for example, a machine-readable carrier. An embodiment of the present invention may relate to a computer program having a program code for executing one of the methods described herein when the computer program is driven on a computer. The present invention may include a computer, or programmable logic device, for executing one of the aforementioned methods described above. A programmable logic device (e.g., a field programmable gate array or a complementary metal oxide semiconductor-based logic circuit) may be used to perform some or all functions of the aforementioned methods.

Although an embodiment of the present invention has been described thus far, it would be obvious to one of ordinary skill in the art that the present invention is changed and modified in various ways by adding, changing, deleting, or modifying components within the scope of the present invention without departing from the spirit of the present invention described in the claims, and this may also be contained in the scope of the present invention.

INDUSTRIAL APPLICABILITY

According to the present invention, the unmanned aerial vehicle may safely and rapidly land.

In detail, a user may check a landing point in the form of image data, may select a landing place, and may more safely land the unmanned aerial vehicle.

The invention claimed is:

1. A method of landing an unmanned aerial vehicle, the method comprising:
upon receiving a request for imaging from a user terminal, transmitting a command for capturing image data by an image sensor included in the unmanned aerial vehicle, by a server;
receiving information of a state of the unmanned aerial vehicle, including at least one selected from altitude information, location information, azimuth information, acceleration information, or angular velocity information of the unmanned aerial vehicle, or the image data captured by the image sensor of the unmanned aerial vehicle, from the unmanned aerial vehicle, by the server;
receiving pixel coordinates selected by a user on the image data captured from the image sensor included in the unmanned aerial vehicle from the user terminal, by the server;
after the receiving the pixel coordinates selected by the user, transforming the pixel coordinates into absolute coordinates based on the information of the state of the unmanned aerial vehicle, by the server;
transmitting the absolute coordinates to the unmanned aerial vehicle, by the server;
prior to the receiving the pixel coordinates, determining while the unmanned aerial vehicle hovers above a predetermined area around a service provision point, by the server, whether an imaging surface of the image data is kept horizontal to a ground by calculating, by the server, roll and pitch of the unmanned aerial vehicle based on at least one selected from azimuth information, acceleration information measured by a 3-axis accelerometer, or angular velocity information measured by a gyroscope of the unmanned aerial vehicle, and transmitting from the server a control command to the unmanned aerial vehicle for keeping the imaging surface of the image data horizontal to the ground,
wherein, in the transforming the pixel coordinates, the server transforms the pixel coordinates into the absolute coordinates using at least one selected from the pixel coordinates, altitude information of the unmanned aerial vehicle, or a viewing angle of the image sensor as a parameter, wherein a predetermined ratio between an actual distance on the ground and a number of pixels in the image data is formed by the keeping the imaging surface of the image data horizontal to the ground, wherein the pixel coordinates are selected by the user after the unmanned aerial vehicle arrives at the service provision point.

2. The method of landing the unmanned aerial vehicle according to claim 1, wherein the method further includes:

receiving the image data from the unmanned aerial vehicle and transmitting the image data to the user terminal, by the server.

3. The method of landing the unmanned aerial vehicle according to claim 1, wherein the method further includes:

upon receiving a user command from the user terminal, transmitting the user command to the unmanned aerial vehicle, by the server.

4. The method of landing the unmanned aerial vehicle according to claim 3, wherein the method further includes:

when the user command is a landing command, transmitting a command for controlling the unmanned aerial vehicle to land on the absolute coordinates to the unmanned aerial vehicle, by the server.

5. The method of landing the unmanned aerial vehicle according to claim 3, wherein the method further includes:

when the user command is a moving command, transmitting a command for controlling the unmanned aerial vehicle to move to moving coordinates to the unmanned aerial vehicle, by the server.

6. The method of landing the unmanned aerial vehicle according to claim 1, wherein the server corrects the image data using a radial distortion constant, a tangential distortion constant, a focal distance, and lens-based image coordinates of a lens included in the image sensor.

7. The method of landing the unmanned aerial vehicle according to claim 1, wherein the transforming the pixel coordinates includes:

extracting recognition points from structure data that is captured a plurality of times for respective distances, by the server;

matching the recognition points in the image data to specify a structure, by the server; and transforming the pixel coordinates into the absolute coordinates with reference to information on a size of the structure from a structure database, by the server.

8. The method of landing the unmanned aerial vehicle according to claim 2, wherein the method further includes:

upon receiving a request of imaging from the user terminal, requesting user authentication information to the user terminal, by the server; and upon receiving the user authentication information from the user terminal, determining whether the user terminal is appropriate based on the user authentication information, by the server.

9. The method of landing the unmanned aerial vehicle according to claim 1, the method further comprising:

prior to the receiving the pixel coordinates, allowing the user to select an arbitrary point as the pixel coordinates on the image data displayed on the user terminal.

10. A method of landing an unmanned aerial vehicle, the method comprising:

upon receiving a request for imaging from a user terminal, capturing image data through an image sensor included in the unmanned aerial vehicle, by the unmanned aerial vehicle;

transmitting the image data to the user terminal;

receiving pixel coordinates selected by a user on the image data of an image sensor included in an unmanned aerial vehicle from a user terminal, by the unmanned aerial vehicle;

transforming the pixel coordinates into absolute coordinates of the unmanned aerial vehicle based on information on a state of the unmanned aerial vehicle including at least one of altitude information, location information, azimuth information, acceleration information, and angular velocity information of the unmanned aerial vehicle, or image data captured from the image sensor of the unmanned aerial vehicle, by the unmanned aerial vehicle;

determining while the unmanned aerial vehicle hovers above a predetermined area around a service provision point whether an imaging surface of the image data is kept horizontal to a ground by calculating, by the unmanned aerial vehicle, roll and pitch of the unmanned aerial vehicle based on at least one selected from azimuth information, acceleration information measured by a 3-axis accelerometer, or angular velocity information measured by a gyroscope of the unmanned aerial vehicle, by the unmanned aerial vehicle; and controlling a posture of the unmanned aerial vehicle to keep the unmanned aerial vehicle horizontal to an imaging surface of the image data, wherein, in the transforming the pixel coordinates, the unmanned aerial vehicle transforms the pixel coordinates into the absolute coordinates using at least one selected from the pixel coordinates, altitude information of the unmanned aerial vehicle, or a viewing angle of the image sensor as a parameter, wherein a predetermined ratio between an actual length on the ground and a number of pixels in the image data is formed by keeping the imaging surface of the image data horizontal to the ground, and wherein the pixel coordinates are selected by the user after the unmanned aerial vehicle arrives at the service provision point.

* * * * *